(12) United States Patent
Hayes et al.

(10) Patent No.: US 12,709,305 B2
(45) Date of Patent: Aug. 18, 2026

(54) TRANSITIONING TO AN AUTONOMOUS DRIVING MODE USING AN OPERATOR CONTROL HISTORY

(71) Applicant: Applied Intuition, Inc., Mountain View, CA (US)

(72) Inventors: John Hayes, Mountain View, CA (US); Volkmar Uhlig, Cupertino, CA (US)

(73) Assignee: Applied Intuition Inc., Mountain View, CA (US)

( * ) Notice: Subject to any disclaimer, the term of this patent is extended or adjusted under 35 U.S.C. 154(b) by 287 days.

(21) Appl. No.: 17/804,155

(22) Filed: May 26, 2022

(65) Prior Publication Data

US 2023/0382432 A1 Nov. 30, 2023

(51) Int. Cl.
*B60W 60/00* (2020.01)

(52) U.S. Cl.
CPC ... *B60W 60/0051* (2020.02); *B60W 2420/403* (2013.01); *B60W 2420/408* (2024.01); *B60W 2556/10* (2020.02)

(58) Field of Classification Search
CPC ...................... B60W 60/0051; B60W 2556/10
See application file for complete search history.

(56) References Cited

U.S. PATENT DOCUMENTS 9,870,002 B1 * 1/2018 Holmberg ................ G05B 6/02
2016/0170413 A1 * 6/2016 Mueller ............... G05D 1/0088 701/23
2016/0252903 A1 * 9/2016 Prokhorov ........ B60W 50/0098 701/23
2018/0299898 A1 * 10/2018 Luo ..................... B60W 30/143
2021/0046946 A1 2/2021 Nemec et al.
2021/0188289 A1 6/2021 Oba
2022/0135048 A1 5/2022 Yokoyama et al.
2022/0153302 A1 5/2022 Arechiga-Gonzalez et al.

OTHER PUBLICATIONS

"Method and System for Dynamically Altering Action Strategy of an Autonomous Vehicle Based on a User's Reactions to Contextual Situations," IP.com Prior Art Database Technical Disclosure Authors et. al.: Disclosed Without Attribution (Year: 2019).*
"Method and process to use driver habits to train autonomous vehicles," An IP.com Prior Art Database Technical Disclosure Authors et. al.: Disclosed Without Attribution (Year: 2013).*
T. - C. Au, M. Quinlan and P. Stone, "Setpoint scheduling for autonomous vehicle controllers, " 2012 IEEE International Conference on Robotics and Automation, Saint Paul, MN, USA, 2012, pp. 2055-2060. (Year: 2012).*

(Continued)

*Primary Examiner* — Joan T Goodbody
(74) *Attorney, Agent, or Firm* — Sheppard Mullin Richter & Hampton LLP

(57) ABSTRACT

Transitioning to an autonomous driving mode using an operator control history, including: storing, during an operator control of an autonomous vehicle, an operator control history; and generating, in response to entering an autonomous driving mode and based on the operator control history, one or more control operations for the autonomous vehicle.

20 Claims, 9 Drawing Sheets

(56) References Cited

OTHER PUBLICATIONS

"Method and System for Dynamically Altering Action Strategy of an Autonomous Vehicle Based on a User's Reactions to Contextual Situations," An IP.com Prior Art Database Technical Disclosure Authors et. al.: Disclosed Without Attribution, IP.com Electronic Publication Date: Nov. 12, 2019 (Year: 2019).*

"Method and process to use driver habits to train autonomous vehicles" An IP.com Prior Art Database Technical Disclosure, Authors et. al.: Disclosed Without Attribution. IP.com Electronic Publication Date: Aug. 21, 2013 (Year: 2013).*

F. Codevilla, M. Muller, A. Lopez, V. Koltun and A. Dosovitskiy, "End-to-End Driving via Conditional Imitation Learning," 2018 IEEE International Conference on Robotics and Automation (ICRA), Brisbane, QLD, Australia, 2018, pp. 4693-4700. (Year: 2018).

Y. Kang, D. A. de Lima and A. Correa Victorino, "Driving behavior correction in human-vehicle interaction based on Dynamic Window Approach," The 4th Annual IEEE International Conference on Cyber Technology in Automation, Control and Intelligent, Hong Kong, China, 2014, pp. 485-490. (Year: 2014).

* cited by examiner

TRANSITIONING TO AN AUTONOMOUS DRIVING MODE USING AN OPERATOR CONTROL HISTORY

BACKGROUND

Field of the Invention

The field of the invention is autonomous vehicle systems, or, more specifically, methods, apparatus, autonomous vehicles, and products for transitioning to an autonomous driving mode using an operator control history.

Description of Related Art

A controller that uses a time series feedback loop to generate control signals begins its time series at the point at which the autonomous driving mode is engaged. That is, the control signals generated by virtue of autonomously generated driving decisions are used in the feedback loop for generating subsequent control operations. As the time series is effectively null or zeroed out when the transition to the autonomous driving mode is performed, there is a delay (e.g., a quarter to a half a second) between when the autonomous driving mode is engaged and when the controller feedback loop is able to provide an output.

SUMMARY

Transitioning to an autonomous driving mode using an operator control history, including: storing, during an operator control of an autonomous vehicle, an operator control history; and generating, in response to entering an autonomous driving mode and based on the operator control history, one or more control operations for the autonomous vehicle.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
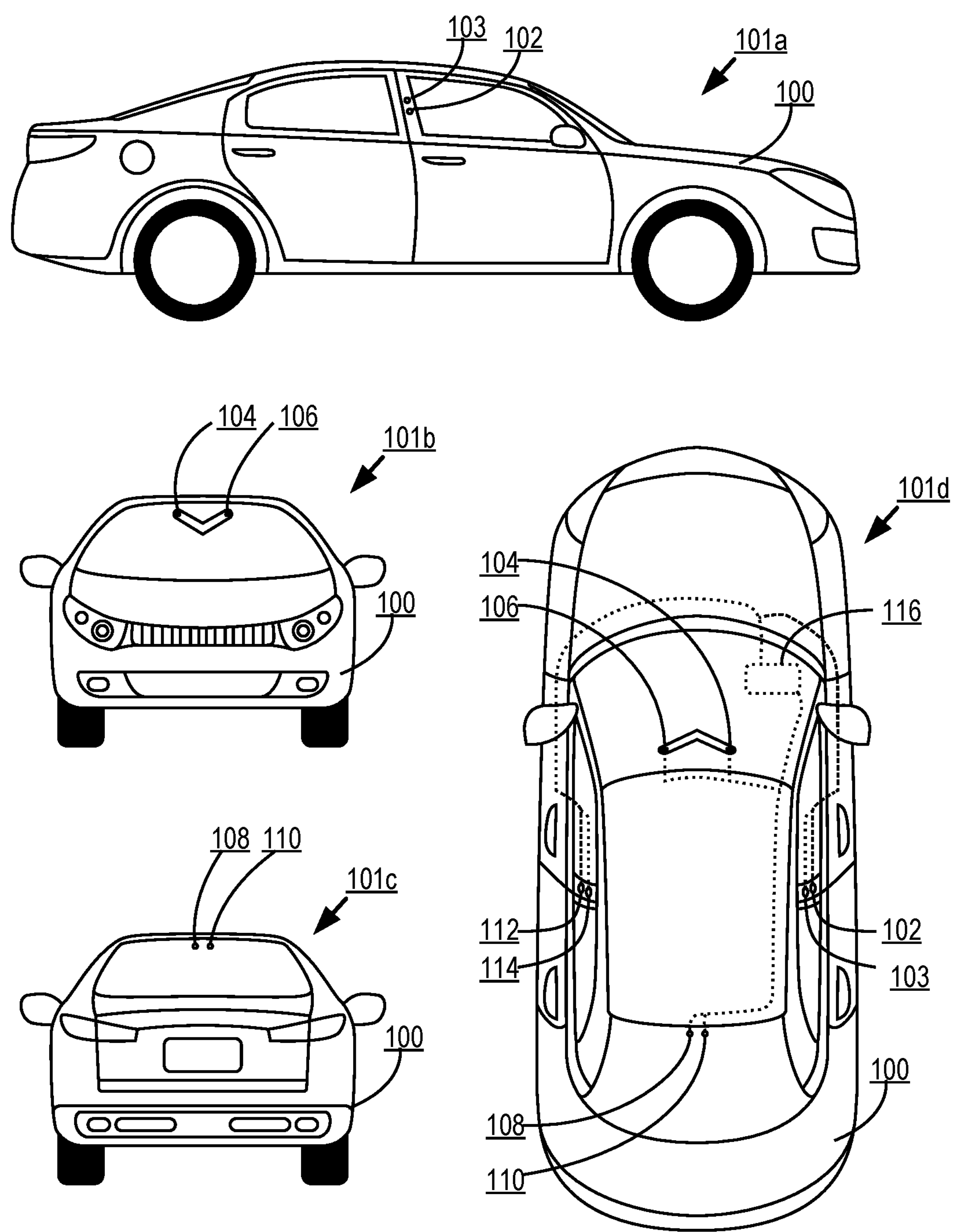
FIG. 1 shows example views of an autonomous vehicle for transitioning to an autonomous driving mode using an operator control history according to some embodiments of the present disclosure according to some embodiments of the present disclosure.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof. Additionally, when an element is described as "plurality," it is understood to mean two or more of such an element. However, as set forth above, further examples may implement the same functionality using a single element/

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Transitioning to an autonomous driving mode using an operator control history may be implemented in an autonomous vehicle. Accordingly, FIG. 1 shows multiple views of an autonomous vehicle 100 configured for transitioning to an autonomous driving mode using an operator control history according to embodiments of the present invention.

Right side view 101*a* shows a right side of the autonomous vehicle 100. Shown in the right side view 101*a* are cameras 102 and 103, configured to capture image data, video data, and/or audio data of the environmental state of the autonomous vehicle 100 from the perspective of the right side of the car. Front view 101*b* shows a front side of the autonomous vehicle 100. Shown in the front view 101*b* are cameras 104 and 106, configured to capture image data, video data, and/or audio data of the environmental state of the autonomous vehicle 100 from the perspective of the front of the car. Rear view 101*c* shows a rear side of the autonomous vehicle 100. Shown in the rear view 101*c* are cameras 108 and 110, configured to capture image data, video data, and/or audio data of the environmental state of the autonomous vehicle 100 from the perspective of the rear of the car. Top view 101*d* shows a rear side of the autonomous vehicle 100. Shown in the top view 101*d* are cameras 102-110. Also shown are cameras 112 and 114, configured to capture image data, video data, and/or audio data of the environmental state of the autonomous vehicle 100 from the perspective of the left side of the car.

Further shown in the top view 101*d* is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102-114 and potentially other sensors), operational data (e.g., a speed, acceleration, gear, orientation, turning direction), and other data to determine a operational state and/or operational history of the autonomous vehicle. The automation computing system 116 may then determine one or more operational commands for the autonomous vehicle (e.g., a change in speed or acceleration, a change in brake application, a change in gear, a change in turning or orientation, etc.). The automation computing system 116 may also capture and store sensor data. Operational data of the autonomous vehicle may also be stored in association with corresponding sensor data, thereby indicating the operational data of the autonomous vehicle 100 at the time the sensor data was captured.

Although the autonomous vehicle 100 if FIG. 1 is shown as car, it is understood that autonomous vehicles 100 configured for transitioning to an autonomous driving mode using an operator control history may also include other vehicles, including motorcycles, planes, helicopters, unmanned aerial vehicles (UAVs, e.g., drones), or other vehicles as can be appreciated. Moreover, it is understood that additional cameras or other external sensors may also be included in the autonomous vehicle 100.

Transitioning to an autonomous driving mode using an operator control history in accordance with the present invention is generally implemented with computers, that is, with automated computing machinery. For further explanation, therefore, FIG. 2 sets forth a block diagram of automated computing machinery comprising an exemplary automation computing system 116 configured for transitioning to an autonomous driving mode using an operator control history according to embodiments of the present invention. The automation computing system 116 of FIG. 2 includes at least one computer Central Processing Unit (CPU) package 204 as well as random access memory 206 (RAM') which is connected through a high speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and have allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102-114 of FIG. 1), accelerometers, Global Positioning System (GPS) radios, Lidar sensors, or other sensors as can be appreciated. As described herein, cameras may include a stolid state sensor 212 with a solid state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 116 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs), etc.). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 212.

Stored in RAM 206 is an automation module 220. The automation module 220 may be configured to process sensor data from the sensors 212 to determine a driving decision for the autonomous vehicle. The driving decision comprises one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other command as can be appreciated. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222.

In some embodiments, the automation module 220 may be configured to determine an exit path for an autonomous vehicle 100 in motion. The exit path includes one or more operational commands that, if executed, are determined and/or predicted to bring the autonomous vehicle 100 safely to a stop (e.g., without collision with an object, without violating one or more safety rules). The automation module 220 may determine a both a driving decision and an exit path at a predefined interval. The automation module 220 may then send the driving decision and the exit path to the autonomous vehicle control systems 223. The autonomous vehicle control systems 223 may be configured to execute the driving decision unless an error state has been reached. If an error decision has been reached, therefore indicating a possible error in functionality of the automation computing system 116), the autonomous vehicle control systems 223 may then execute a last received exit path in order to bring the autonomous vehicle 100 safely to a stop. Thus, the autonomous vehicle control systems 223 are configured to receive both a driving decision and exit path at predefined intervals, and execute the exit path in response to an error.

The autonomous vehicle control systems 223 are configured to affect the movement and operation of the autonomous vehicle 100. For example, the autonomous vehicle control systems 223 may activate (e.g., apply one or more control signals) to actuators or other components to turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor 212 data (e.g., sensor 212 data having object recognition, compression, depth filtering, or other processes applied). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 218) prior to upload to a execution environment 227. Such operations can include filtering, compression, encoding, decoding, or other operations as can be appreciated. The data processing module 226 may then communicate the processed and stored sensor data to the execution environment 227.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation module 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's i OS™, and others as will occur to those of skill in the art. For example, the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Readers will appreciate that although the example included in the preceding paragraph relates to an embodiment where the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. For example, as the automation module 220 must make determinations as to operational commands to facilitate autonomous operation of a vehicle. Accordingly, the automation module 220 must make such determinations within one or more time constraints in order for autonomous operation to be performed in real time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constrains, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

Figure 2:
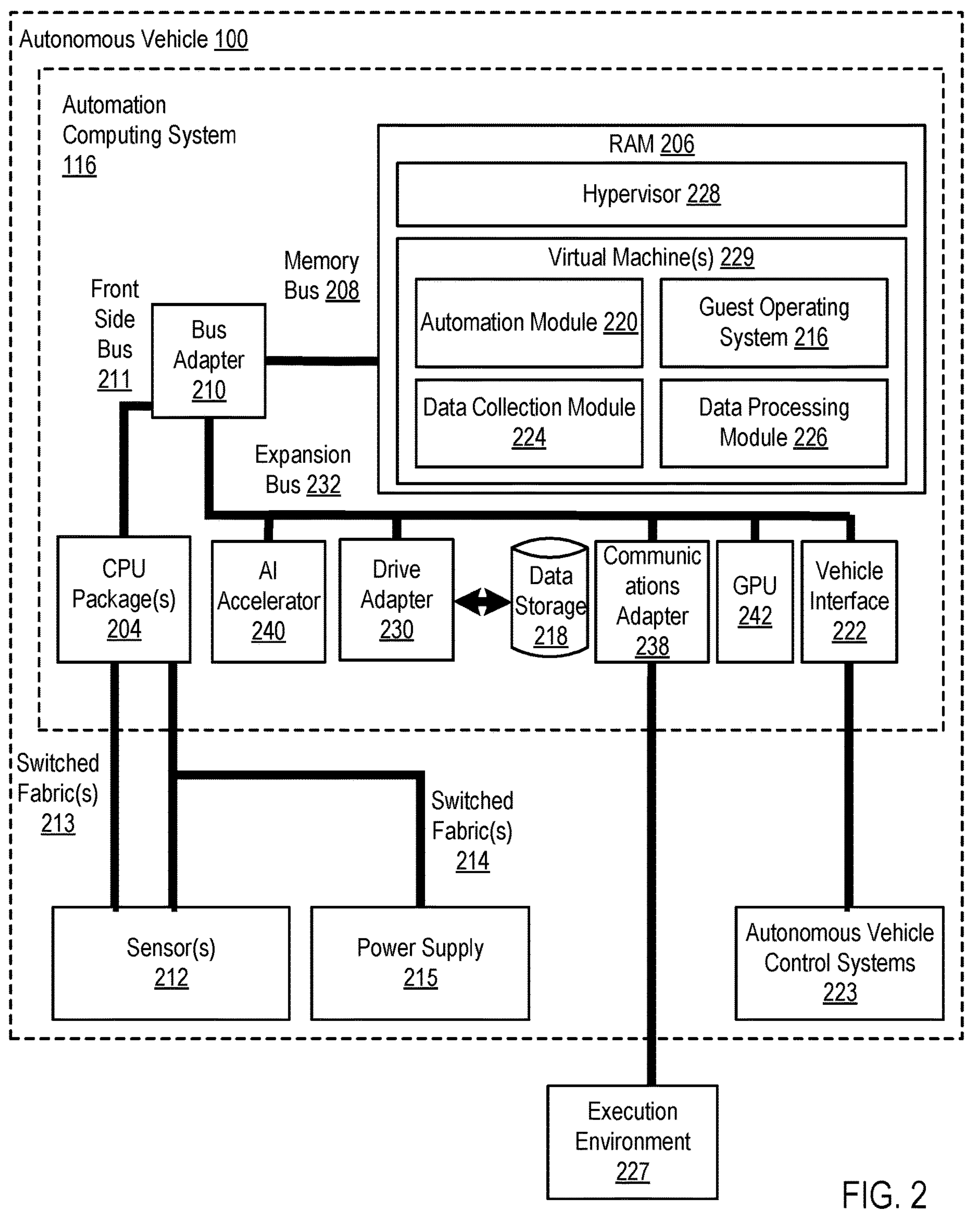
FIG. 2 is a block diagram of an autonomous computing system for transitioning to an autonomous driving mode using an operator control history according to some embodiments of the present disclosure.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as a disk drive. Moreover, any of the automation module 220, data collection module 224, and data processing module 226 may be executed in a virtual machine 229 and facilitated by a guest operating system 216 of that virtual machine 229.

The automation computing system 116 of FIG. 2 includes disk drive adapter 230 coupled through expansion bus 232 and bus adapter 210 to CPU package(s) 204 and other components of the automation computing system 116. Disk drive adapter 230 connects non-volatile data storage to the automation computing system 116 in the form of data storage 218. Disk drive adapters 230 useful in computers configured for transitioning to an autonomous driving mode using an operator control history according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for transitioning to an autonomous driving mode using an operator control history according to embodiments of the present invention include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed execution environments 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
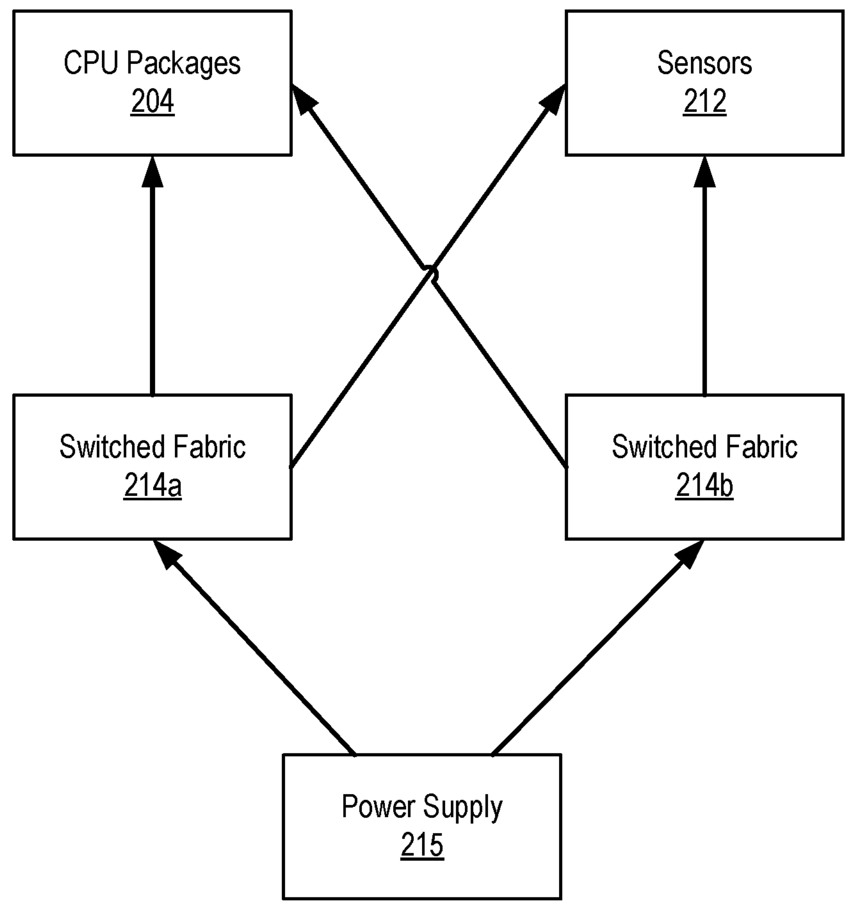
FIG. 3 is a block diagram of a redundant power fabric for transitioning to an autonomous driving mode using an operator control history according to some embodiments of the present disclosure.

FIG. 3 shows an example redundant power fabric for transitioning to an autonomous driving mode using an operator control history. The redundant power fabric provides redundant pathways for power transfer between the power supplies 215, the sensors 212, and the CPU packages

204. In this example, the power supplies 215 are coupled to the sensors 212 and CPU packages via two switched fabrics 214*a* and 214*b*. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214*a* and 214*b* may provide power to the sensors 212 using various connections, including Mobile Industry Processor Interface (MIPI), Inter-Integrated Circuit (I2C), Universal Serial Bus (USB), or another connection. The switched fabrics 214*a* and 214*b* may also provide power to the CPU packages 204 using various connections, including Peripheral Component Interconnect Express (PCIe), USB, or other connections. Although only two switched fabrics 214*a* and 214*b* are shown connecting the power supplies 215 to the sensors 212 and CPU packages 204, it is understood that the approach shown by FIG. 3 can be modified to include additional switched fabrics 214.

Figure 4:
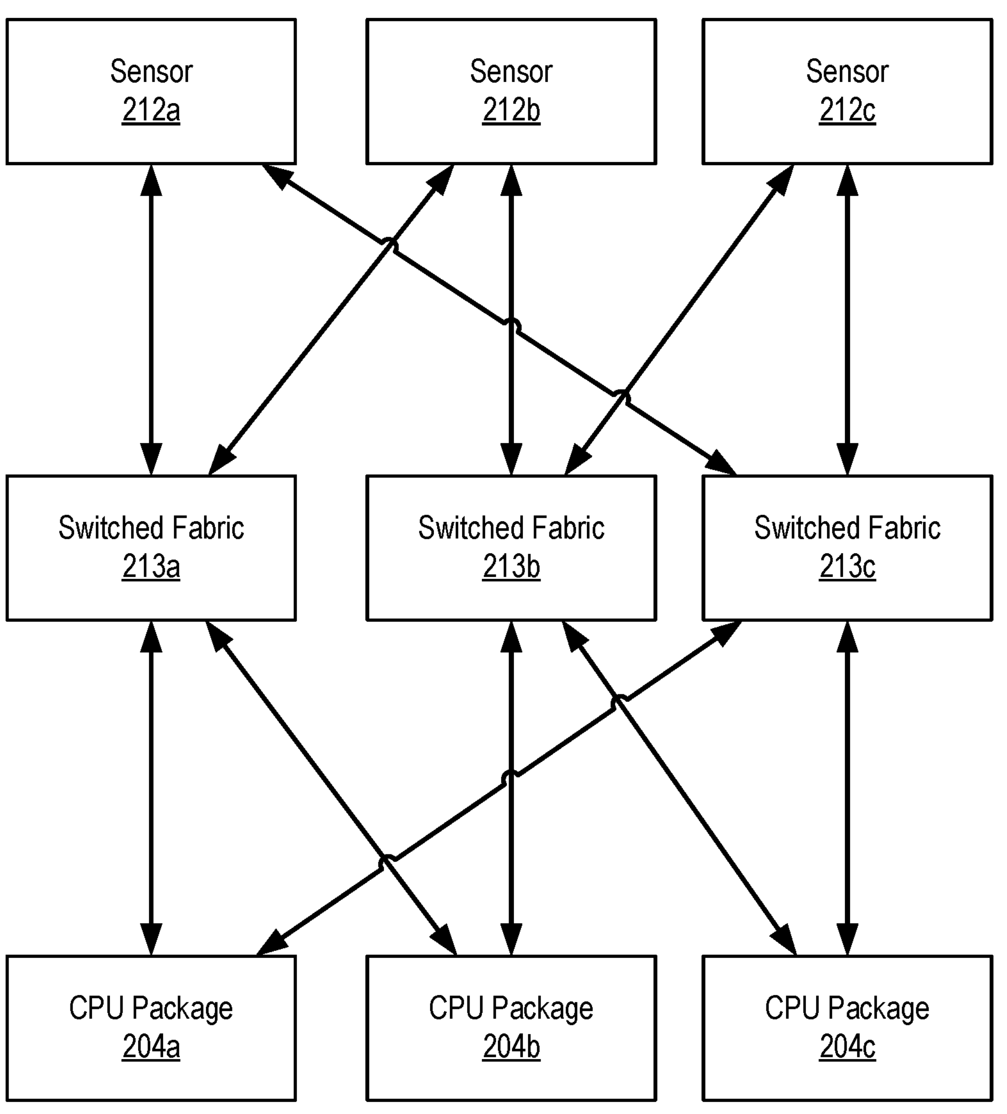
FIG. 4 is a block diagram of a redundant data fabric for transitioning to an autonomous driving mode using an operator control history according to some embodiments of the present disclosure.

FIG. 4 is an example redundant data fabric for transitioning to an autonomous driving mode using an operator control history. The redundant data fabric provides redundant data connection pathways between sensors 212 and CPU packages 204. In this example view, three CPU packages 204*a*, 204*b*, and 204*c* are connected to three sensors 212*a*, 212*b*, and 212*c* via three switched fabrics 213*a*, 213*b*, and 213*c*. Each CPU package 204*a*, 204*b*, and 204*c* is connected to a subset of the switched fabrics 213*a*, 213*b*, and 213*c*. For example, CPU package 204*a* is connected to switched fabrics 213*a* and 213*c*, CPU package 204*b* is connected to switched fabrics 213*a* and 213*b*, and CPU package 204*c* is connected to switched fabrics 213*b* and 213*c*. Each switched fabric 213*a*, 213*b*, and 213*c* is connected to a subset of the sensors 212*a*, 212*b*, and 212*c*. For example, switched fabric 213*a* is connected to sensors 212*a* and 212*b*, switched fabric 213*b* is connected to sensor 212*b* and 212*c*, and switched fabric 213*c* is connected to sensors 212*a* and 212*c*. Under this topology, each CPU package 204*a*, 204*b*, and 204*c* has an available connection path to any sensor 212*a*, 212*b*, and 212*c*. It is understood that the topology of FIG. 4 is exemplary, and that CPU packages, switched fabrics, sensors, or connections between components may be added or removed while maintaining redundancy as can be appreciated by one skilled in the art.

Figure 5:
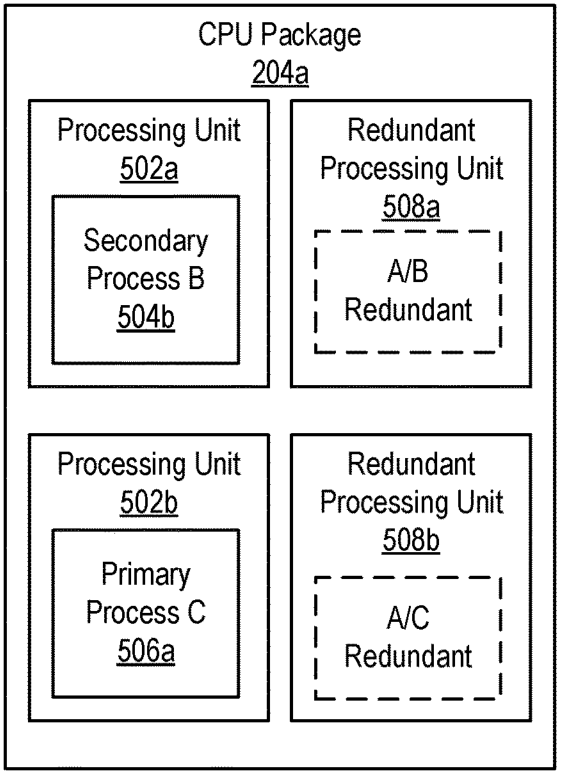
FIG. 5 is an example view of process allocation across CPU packages for transitioning to an autonomous driving mode using an operator control history according to some embodiments of the present disclosure.
Figure 5:
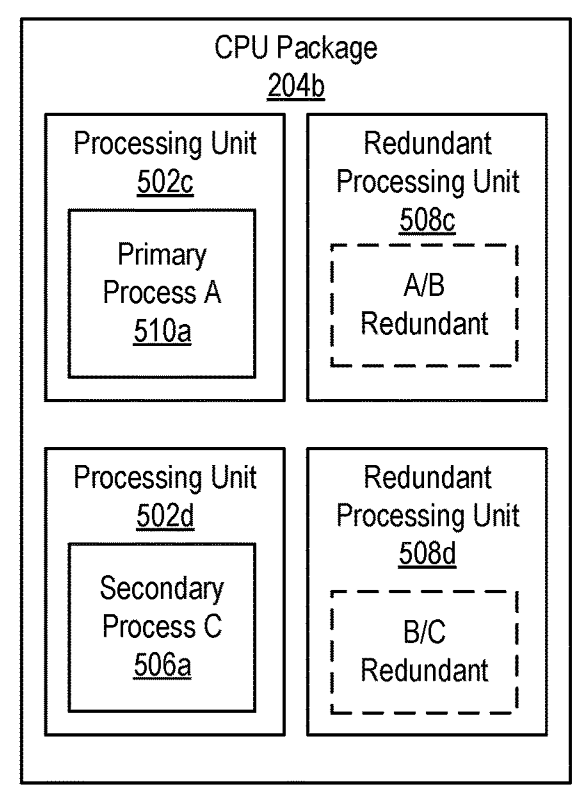
Figure 5:
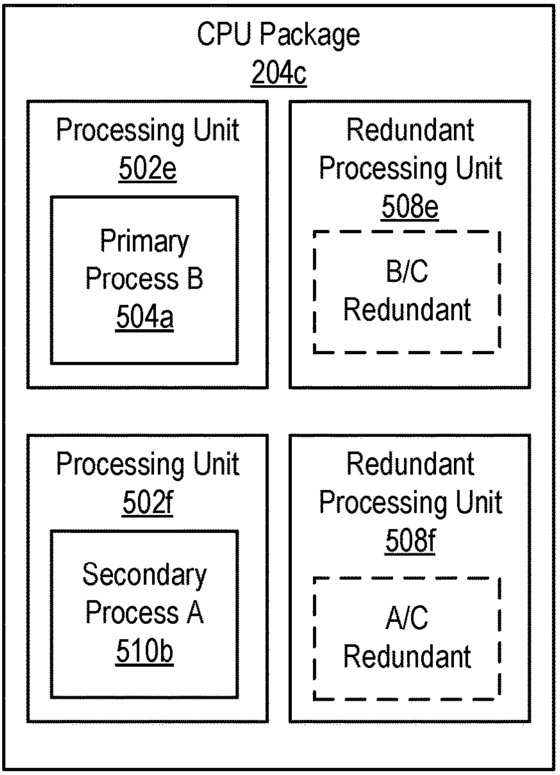

FIG. 5 is an example view of process allocation across CPU packages for transitioning to an autonomous driving mode using an operator control history. Shown are three CPU packages 204*a*, 204*b*, and 204*c*. Each CPU package 204*a* includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204*a*, processing unit 502*a* has been allocated secondary execution of "process B," denoted as secondary process B 504*b*, while processing unit 502*b* has been allocated primary execution of "process C," denoted as primary process C 506*a*.

CPU package 204*a* also comprises two redundant processing units that are not actively executing a process A, B, or C, but are instead reserved in case of failure of an active processing unit. Redundant processing unit 508*a* has been reserved as "A/B redundant," indicating that reserved processing unit 508*a* may be allocated primary or secondary execution of processes A or B in the event of a failure of a processing unit allocated the primary or secondary execution of these processes. Redundant processing unit 508*b* has been reserved as "A/C redundant," indicating that reserved processing unit 508*b* may be allocated primary or secondary execution of processes A or C in the event of a failure of a processing unit allocated the primary or secondary execution of these processes.

CPU package 204*b* includes processing unit 502*c*, which has been allocated primary execution of "process A," denoted as primary process A 510*a*, and processing unit 502*d*, which has been allocated secondary execution of "process C," denoted as secondary process C 506*a*. CPU package 204*b* also includes redundant processing unit 508*c*, reserved as "A/B redundant," and redundant processing unit 508*d*, reserved as "B/C redundant." CPU package 204*c* includes processing unit 502*e*, which has been allocated primary execution of "process B," denoted as primary process B 504*a*, and processing unit 502*f*, which has been allocated secondary execution of "process A," denoted as secondary process A 510*b*. CPU package 204*c* also includes redundant processing unit 508*e*, reserved as "B/C redundant," and redundant processing unit 508*f*, reserved as "A/C redundant."

As set forth in the example view of FIG. 5, primary and secondary instances processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508*a-f* allow for allocation of primary or secondary execution of a process in the event of processing unit failure. This further prevents errors caused by processing unit failure as parallel primary and secondary execution of a process may be restored. One skilled in the art would understand that the number of CPU packages, processing units, redundant processing units, and processes may be modified according to performance requirements while maintaining redundancy.

Figure 6:
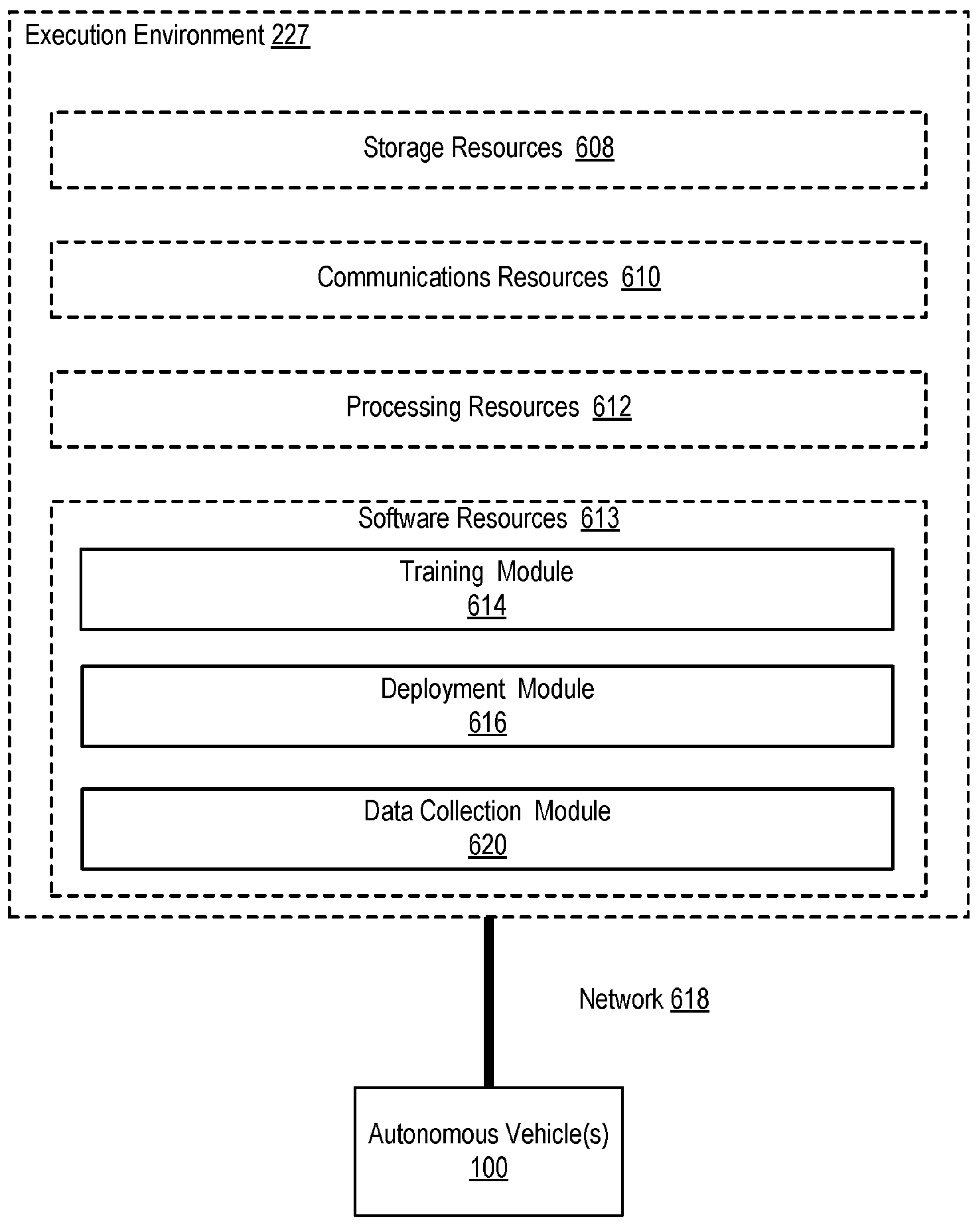
FIG. 6 is an example view of an execution environment for transitioning to an autonomous driving mode using an operator control history according to some embodiments of the present disclosure.

For further explanation, FIG. 6 sets forth a diagram of an execution environment 227 accordance with some embodiments of the present disclosure. The execution environment 227 depicted in FIG. 6 may be embodied in a variety of different ways. The execution environment 227 may be provided, for example, by one or more physical or virtual machine components consisting of bare-metal applications, operating systems such as Android, Linux, Real-time Operating systems (RTOS), Automotive RTOS, such as AutoSAR, and others, including combinations thereof. The execution environment 227 may also be provided by cloud computing providers such as Amazon AWS, Microsoft Azure, Google Cloud, and others, including combinations thereof. Alternatively, the execution environment 227 may be embodied as a collection of devices (e.g., servers, storage devices, networking devices) and software resources that are included in a computer or distributed computer or private data center. Readers will appreciate that the execution environment 227 may be constructed in a variety of other ways and may even include resources within one or more autonomous vehicles or resources that communicate with one or more autonomous vehicles.

The execution environment 227 depicted in FIG. 6 may include storage resources 608, which may be embodied in many forms. For example, the storage resources 608 may include flash memory, hard disk drives, nano-RAM, 3D crosspoint non-volatile memory, MRAM, non-volatile phase-change memory ('PCM'), storage class memory ('SCM'), or many others, including combinations of the storage technologies described above. Readers will appreciate that other forms of computer memories and storage devices may be utilized as part of the execution environment 227, including DRAM, SRAM, EEPROM, universal memory, and many others. The storage resources 608 may also be embodied, in embodiments where the execution environment 227 includes resources offered by a cloud provider, as cloud storage resources such as Amazon Elastic Block Storage ('EBS') block storage, Amazon S3 object storage, Amazon Elastic File System ('EFS') file storage, Azure Blob Storage, and many others. The example execution environment 227 depicted in FIG. 6 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders, and presented to both the system storing it and the system retrieving it in the same format.

The execution environment 227 depicted in FIG. 6 also includes communications resources 610 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 610 may be configured to utilize a variety of different protocols and data communication fabrics to facilitate data communications. For example, the communications resources 610 may utilize Internet Protocol ('IP') based technologies, fibre channel ('FC') technologies, FC over ethernet ('FCoE') technologies, InfiniBand ('IB') technologies, NVM Express ('NVMe') technologies and NVMe over fabrics ('NVMeoF') technologies, and many others. The communications resources 610 may also be embodied, in embodiments where the execution environment 227 includes resources offered by a cloud provider, as networking tools and resources that enable secure connections to the cloud as well as tools and resources (e.g., network interfaces, routing tables, gateways) to conFIG. networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle).

The execution environment 227 depicted in FIG. 6 also includes processing resources 612 that may be useful in useful in executing computer program instructions and performing other computational tasks within the execution environment 227. The processing resources 612 may include one or more application-specific integrated circuits ('ASICs') that are customized for some particular purpose, one or more central processing units ('CPUs'), one or more digital signal processors ('DSPs'), one or more field-programmable gate arrays ('FPGAs'), one or more systems on a chip ('SoCs'), or other form of processing resources 612. The processing resources 612 may also be embodied, in embodiments where the execution environment 227 includes resources offered by a cloud provider, as cloud computing resources such as one or more Amazon Elastic Compute Cloud ('EC2') instances, event-driven compute resources such as AWS Lambdas, Azure Virtual Machines, or many others.

The execution environment 227 depicted in FIG. 6 also includes software resources 613 that, when executed by processing resources 612 within the execution environment 227, may perform various tasks. The software resources 613 may include, for example, one or more modules of computer program instructions that when executed by processing resources 612 within the execution environment 227 are useful in training neural networks configured to determine control autonomous vehicle control operations. For example, a training module 614 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 614 may provide a corpus of training data, or a selected subset of training data, to train the neural network. For example, the training module 614 may select particular subsets of training data associated with particular driving conditions, environment states, etc. to train the neural network.

The software resources 613 may include, for example, one or more modules of computer program instructions that when executed by processing resources 612 within the execution environment 227 are useful in deploying software resources or other data to autonomous vehicles 100 via a network 618. For example, a deployment module 616 may provide software updates, neural network updates, or other data to autonomous vehicles 100 to facilitate autonomous vehicle control operations.

The software resources 613 may include, for example, one or more modules of computer program instructions that when executed by processing resources 612 within the execution environment 227 are useful in collecting data from autonomous vehicles 100 via a network 618. For example, a data collection module 620 may receive, from autonomous vehicles 100, collected sensor 212, associated control operations, software performance logs, or other data. Such data may facilitate training of neural networks via the training module 614 or stored using storage resources 608.

Figure 7:
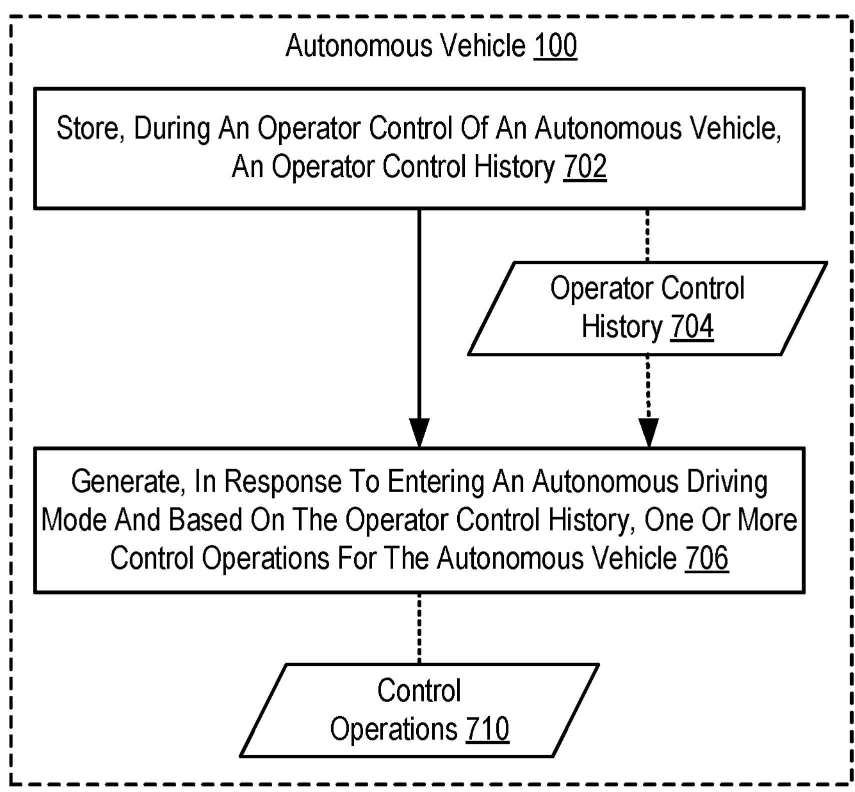
FIG. 7 is a flowchart of an example method for transitioning to an autonomous driving mode using an operator control history according to some embodiments of the present disclosure.

For further explanation, FIG. 7 sets forth a flow chart illustrating an exemplary method for transitioning to an autonomous driving mode using an operator control history according to some embodiments of the present disclosure. The method of FIG. 7 may be implemented, for example, in an autonomous vehicle 100. In some embodiments, the method of FIG. 7 may be performed by one or more components of the autonomous vehicle control systems 223. For example, the method of FIG. 7 may be performed using one or more controllers that control various actuators or other signal-driven mechanical components that control the steering, acceleration, braking, and the like of the autonomous vehicle 100. In other embodiments, the method of FIG. 7 may be performed using the automation computing system 116 of the autonomous vehicle 100. In further embodiments, the method of FIG. 7 may be performed using a combination of the automation computing system 116 and the autonomous vehicle control systems 223.

The method of FIG. 7 includes storing 702, during an operator control of an autonomous vehicle 100, an operator control history 704. In some embodiments, the autonomous vehicle 100 is considered under operator control when a full autonomous driving mode is not engaged. For example, the autonomous vehicle 100 is considered under operator control during a non-autonomous driving mode, whereby the steering, acceleration, braking, and the like of the autonomous vehicle 100 are fully under control of an operator (e.g., a user, a driver, and the like). In some embodiments, the autonomous vehicle 100 is considered under operator control during a partially autonomous driving mode, where certain, but not all, aspects of control are performed by or assisted by autonomous driving features. For example, a partially autonomous driving mode may include using driving assist features that maintain the autonomous vehicle 100 in a particular lane, prevent collisions during a lane change or due to the proximity of other vehicles, and the like.

The operator control history 704 describes various control inputs from the operator. As an example, in some embodiments, the operator control history 704 includes an actuator history describing the particular control signals provided to various actuators in the autonomous vehicle 100 due to operator control. During operation of the autonomous vehicle 100, operator activation and release of a steering wheel, throttle, brake, and the like will generate control signals to various actuators of the steering, acceleration, and braking systems, respectively. Accordingly, in some embodiments, storing 702 the operator control history 702 includes storing data describing one or more control signals provided to these one or more actuators.

In some embodiments, the operator control history 704 includes a user behavior history describing one or more user actions. As an example, the user behavior history indicates user interactions with particular inputs (e.g., to a touch screen, buttons, switches and the like). As another example, the user behavior history indicates a facing or direction of focus of the user (e.g., as determined using interior cameras of the vehicle).

In some embodiments, the operator control history 704 is stored as a time series. In other words, each data point describing a particular control signal is associated with a particular time value or time code. In some embodiments, the time value or time code is stored or encoded in the operator control history 704. In other embodiments, the time value or time code is implicit and determined by virtue of an ordering or storage location for a particular piece of data in the operator control history 704. For example, in some embodiments, the operator control history 704 is stored as a sliding time window or other collection of the most recent instances of operator control history 704 (e.g., the N-most recent samples, those samples gathered within the last N-seconds, and the like). Accordingly, the samples of operator control history 704 may be stored in a particular ordering based on a recency of the operator control history 704 sample.

In some embodiments, the operator control history 704 is stored in a buffer, cache, RAM, or other quickly accessible and potentially volatile form of memory used for temporary or short-term storage. In some embodiments, the operator control history 704 is stored in long-term or non-volatile memory. In further embodiments, the operator control history 704 is stored in combinations of volatile and non-volatile memory.

In some embodiments, multiple operator control histories 704 are maintained with each operator control history 704 corresponding to a particular actuator or combination of associated or related components. For example, for each controller driving a particular actuator, the controller may maintain or be communicatively coupled to a corresponding operator control history 704. Thus, in some embodiments, storing 702 the operator control history 704 may include storing a portion of operator control history 704 in the corresponding operator control history 704 for the particular actuator or component affected by the operator input.

The method of FIG. 7 also includes generating 706, in response to entering an autonomous driving mode and based on the operator control history 704, one or more control operations 710 for the autonomous vehicle 100. For example, in some embodiments, the autonomous vehicle 100 enters the autonomous driving mode in response to a command, signal, or input from the operator. Such inputs may include, for example, releasing the steering wheel, touching neither the accelerator or brake pedal with a foot, activation of a button, switch, or other input device, providing a voice command, and the like. In other embodiments, entering the autonomous driving mode is performed in response to a determination by the autonomous vehicle 100 to enter the autonomous driving mode as part of a driver assistance function, a collision avoidance operation, and the like. During the autonomous driving mode, the autonomous vehicle 100 generates the control signals provided to the various actuators of the autonomous vehicle 100 by virtue of determining particular driving decisions by the autonomous vehicle 100. Accordingly, the generated 706 control operations 710 may include particular control signals for particular actuators.

Control signals for particular actuators may be generated using time series data. As an example, a proportional-integral-derivative (PID) controller in a feedback loop may be used to output control signals that may drive a particular process value to a desired set point. For example, an acceleration control signal may be used to drive a current velocity (process value) to a desired velocity (set point). In this example, the PID controller uses a combination of proportional, integral, and derivative terms to calculate the output control signal, with the integral term being based on a time series. One skilled in the art will appreciate that a PID controller is merely an illustrative example, and that other controllers that use time series data are also contemplated within the scope of the present disclosure.

In some embodiments, control signals for particular actuators may be generated based on a plurality of equations for particular attributes. For example, particular attributes (e.g., acceleration, velocity, braking, steering angle, and the like) may each be calculated using multiple multivariable equations. Each equation may be associated with different levels of uncertainty or weights. Moreover, each variable of the equations may be associated with different degrees of noise. Accordingly, a control signal affecting or corresponding to a particular attribute may be calculated by solving a series of equations for that attribute.

In existing autonomous driving solutions, a controller that uses a time series feedback loop to generate control signals begins its time series at the point at which the autonomous driving mode is engaged. That is, the control signals generated by virtue of autonomously generated driving decisions are used in the feedback loop for generating subsequent control operations. As the time series is effectively null or zeroed out when the transition to the autonomous driving mode is performed, there is a delay (e.g., a quarter to a half a second) between when the autonomous driving mode is engaged and when the controller feedback loop is able to provide an output.

In contrast, the one or more control operations 710 for the autonomous vehicle 100 are generated using the operator control history 704. The operator control history 704 serves as a time series upon which a control operation 710 (e.g., a control signal) may be generated as part of an autonomous driving mode. In other words, the operator control history 704 is effectively treated as a history or time series of output control operations from a controller feedback loop in order to drive a next iteration of the feedback loop. Accordingly, in some embodiments, the control operations 710 may be generated based at least in part on an integral or other function of a time series of the operator control history 704 (e.g., as part of a PID controller or a similar controller). This allows the controller to begin generating output control signals without the delay that would otherwise be required in order for a purely autonomously driven time series to be populated.

As an example, in some embodiments, the operator control history 704 is provide as an input to a feedback loop for generating control operations 710 (e.g., control signals) for a particular actuator. In some embodiments, the autonomous vehicle 100 maintains multiple operator control histories 704 each corresponding to a particular actuator or combination of components. Accordingly, in some embodiments, generating 706 the control operators 710 includes generating control operations 710 for each particular actuator based on the operator control history 704 for that particular actuator.

Figure 8:
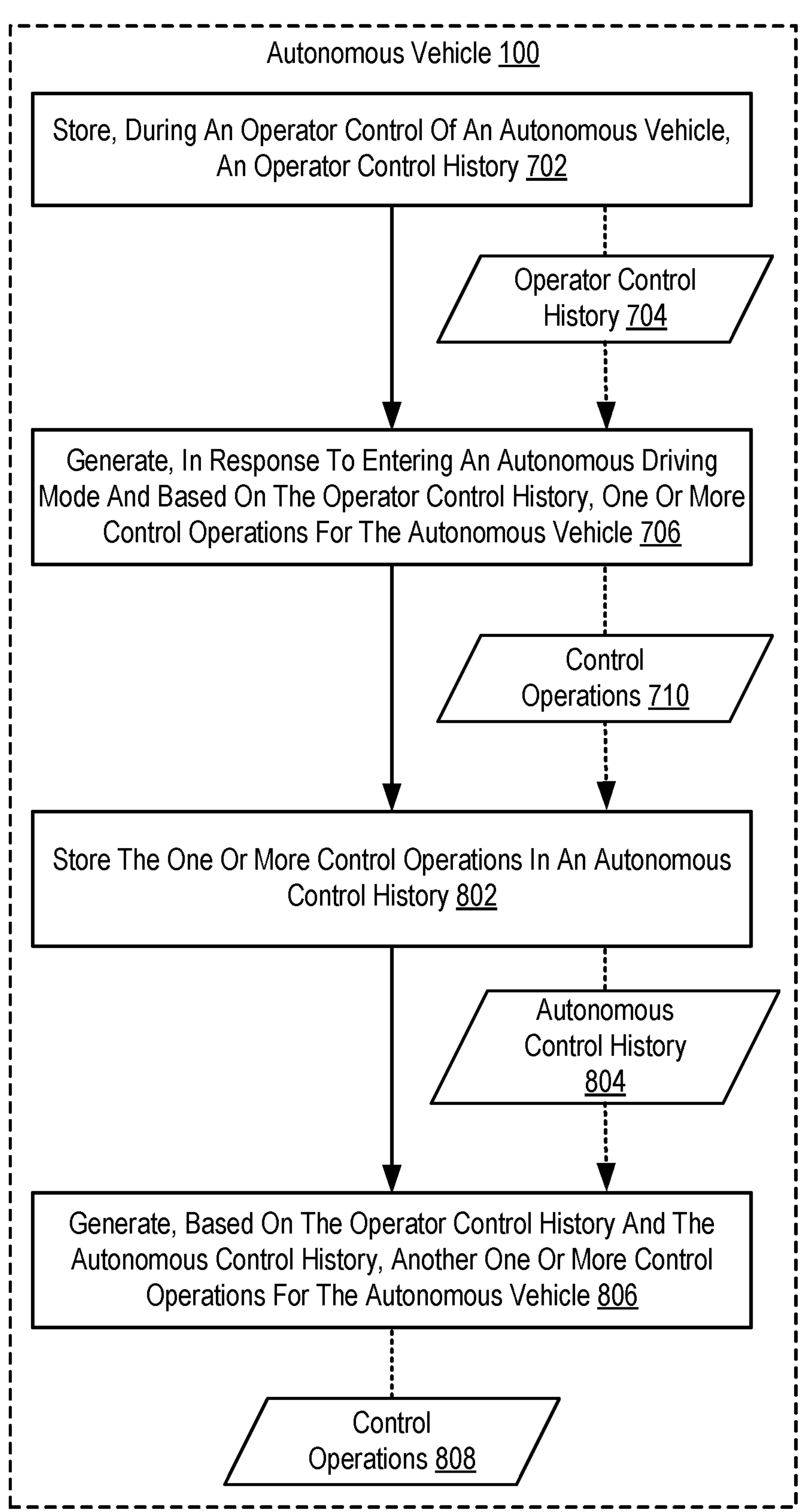
FIG. 8 is a flowchart of another example method for transitioning to an autonomous driving mode using an operator control history according to some embodiments of the present disclosure.

For further explanation, FIG. 8 sets forth a flowchart of another method for transitioning to an autonomous driving mode using an operator control history according to some embodiments of the present disclosure. The method of FIG. 8 is similar to FIG. 7 in that the method of FIG. 8 includes storing 702, during operator control of an autonomous vehicle 100, an operator control history 702; and generating 706, in response to entering an autonomous driving mode and based on the operator control history 704, one or more control operations 710 for the autonomous vehicle 100.

FIG. 8 differs from FIG. 7 in that the method of FIG. 8 includes storing 802 the one or more control operations in an autonomous control history 804. The autonomous control history 804 is similar to the operator control history 702 except that the control signals (e.g., the actuator history) stored in the autonomous control history 804 are the result of executed autonomous driving decisions, not operator input. Accordingly, the autonomous control history 804 may include a time series similar to that of the operator control history 704. Thus, data describing the generated 706 control operations 710 is stored 802 as the autonomous control history 804.

In some embodiments, the autonomous control history 804 is stored separately from the operator control history 704. In other embodiments, the autonomous control history 804 is stored concurrently with the operator control history 704 in a same area of memory, a same buffer, a same cache, and the like. For example, assume that, during operator control, the control signals to a given actuator are stored in a particular storage area (e.g., memory, buffer, cache, and the like) or data structure. After the transition to an autonomous driving mode, the control signals to that actuator generated by virtue of executing autonomous driving decisions (e.g., including the control operations 710) are written to this storage area. Thus, data describing control signals to the given actuator are stored together independent of whether the control signals were the result of an operator input or an executed driving decision.

The method of FIG. 8 also includes generating 806, based on the operator control history 704 and the autonomous control history 804, another one or more control operations 808 for the autonomous vehicle 100. As was described above, the control operations 710,808 may be generated using a time serious of previously generated control operations 710,808 (e.g., by virtue of an integral performed by a PID controller or other integrator controller). Accordingly, a time series including both the operator control history 704 and the autonomous control history 804 is provided as input (e.g., to a feedback loop or other controller input) to generate the control operations 808. For example, where the operator control history 704 and autonomous control history 804 are stored together in a same storage area of data structure, this storage area may be continually updated based on the control signals to a given actuator independent of the source (e.g., independent of whether the control signal was generated by an operator input or an executed driving decision). The data in this storage area is then provided to the feedback loop of the controller to generate the next control operation 808.

One skilled in the art will appreciate that, after generating 806 the control operations 808, data describing the control operations 808 may be stored in the autonomous control history 804, thereby being inserted into a feedback loop for generating control operations 808. Moreover, one skilled in the art will appreciate that, if the autonomous vehicle 100 reenters an operator controlled mode (e.g., not an autonomous driving mode), the operator control history 704 may then be updated to reflect the operator inputs, which may then later be used in a feedback loop upon transition back to an autonomous driving mode.

Figure 9:
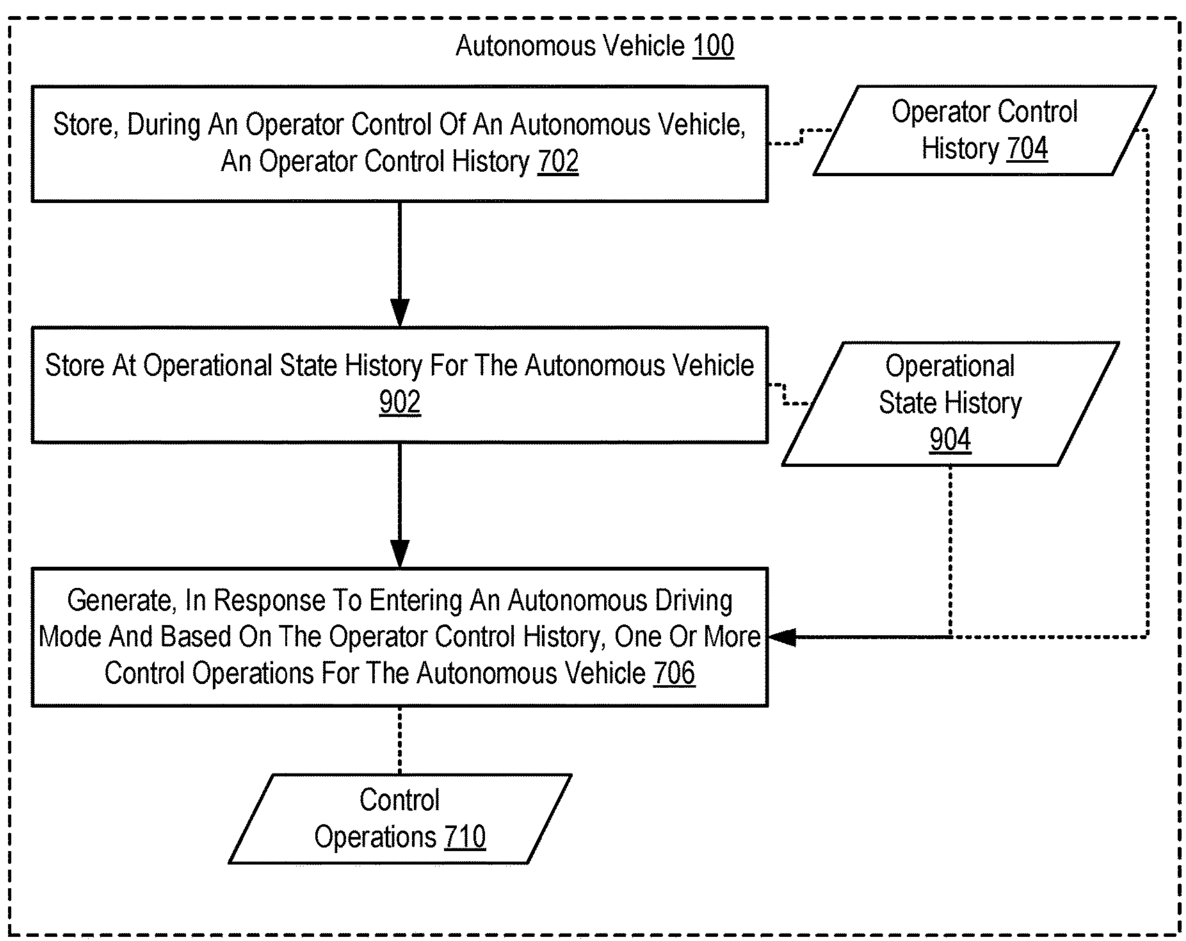
FIG. 9 is a flowchart of another example method for transitioning to an autonomous driving mode using an operator control history according to some embodiments of the present disclosure.

For further explanation, FIG. 9 sets forth a flowchart of another method for transitioning to an autonomous driving mode using an operator control history according to some embodiments of the present disclosure. The method of FIG. 9 is similar to FIG. 7 in that the method of FIG. 9 includes storing 702, during operator control of an autonomous vehicle 100, an operator control history 702; and generating 706, in response to entering an autonomous driving mode and based on the operator control history 704, one or more control operations 710 for the autonomous vehicle 100.

FIG. 9 differs from FIG. 7 in that the method of FIG. 9 includes storing 902 an operational state history 904 for the autonomous vehicle 100. The operational state history 904 describes the movement of the autonomous vehicle 100 during operation and potentially the movement or state of various components of the autonomous vehicle 100. For example, the operational state history 904 may describe a speed, velocity, angle of motion, and the like of the autonomous vehicle 100. In some embodiments, the operational state history 904 is stored concurrent to the operation control history 704 such that the operational state history 904 describes the movement or state of the autonomous vehicle 100 during operator control.

The method of FIG. 9 further differs from FIG. 7 in that generating 706 the one or more control operations 710 is further based on the operational state history 904. As an example, the operational state history 904 may be provided to one or more models used to generate particular driving decisions and/or control operations 710 for the autonomous vehicle 100. One skilled in the art will appreciate that, in some scenarios, the behavior of an autonomous vehicle 100 may diverge from control operations or user actions that affect that behavior. For example, assume that, either by virtue of an autonomous driving decision or an operator interaction, brakes are applied in order to decelerate the vehicle. However, under certain driving conditions (e.g., a wet or icy road), the vehicle may not slow down as desired. Accordingly, both the control operations or signals as well as the behavior of the autonomous vehicle 100 should be separately considered as factors or inputs in determining control operations 710.

Although the preceding discussion describes generating 710 control operations based on both an operational state history 904 and the operator control history 710, one skilled in the art will appreciate that, in some embodiments, only the operational state history 904 may be used to generate control operations 710.

In view of the explanations set forth above, readers will recognize that the benefits of transitioning to an autonomous driving mode using an operator control history according to embodiments of the present invention include improved performance of an autonomous vehicle by reducing the delay for generating actuator control signals in response to transitioning to an autonomous driving mode.

In addition to the approaches set forth above, other factors may also be used in generating control operations in addition to the operator control history 701. For example, sensor data (e.g., video data) capturing an interior of the vehicle may be used to identify various physical attributes of a driver, including a gaze, posture, gestures, visual focus, and the like. Such physical attributes may also then be used to generate the particular control operations.

Exemplary embodiments of the present invention are described largely in the context of a fully functional computer system for transitioning to an autonomous driving mode using an operator control history. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for transitioning to an autonomous driving mode using an operator control history, comprising:

storing, during an operator control of an autonomous vehicle in a non-autonomous driving mode, an operator control history as a sliding window time series of a plurality of most recent instances of operator control history; and reducing a delay for generating one or more actuator control signals, using a proportional-integral-derivative controller and an integral based on the sliding window time series, in response to transitioning to an autonomous driving mode by:

generating, in response to entering the autonomous driving mode and based on the operator control history, one or more control operations for the autonomous vehicle by generating the one or more actuator control signals, wherein the one or more actuator control signals are configured to drive one or more process values including a current velocity to desired set points.

2. The method of claim 1, wherein the operator control history comprises one or more actuator histories.

3. The method of claim 1, further comprising:

storing an operational state history for the autonomous vehicle; and wherein generating the one or more control operations is further based on the operational state history.

4. The method of claim 1, further comprising storing the one or more control operations in an autonomous control history.

5. The method of claim 4, further comprising generating, based on the operator control history and the autonomous control history, another one or more control operations for the autonomous vehicle.

6. An apparatus comprising:

a memory; and a processing device, operatively coupled to the memory, the processing device configured to:

store, during an operator control of an autonomous vehicle in a non-autonomous driving mode, an operator control history as a sliding window time series of a plurality of most recent instances of operator control history; and reduce a delay for generating one or more actuator control signals, using a proportional-integral-derivative controller in response to transitioning to an autonomous driving mode by:

generate, in response to entering the autonomous driving mode and based on the operator control history, one or more control operations for the autonomous vehicle by generating the one or more actuator control signals, wherein the one or more actuator control signals are configured to drive one or more process values including a current velocity to desired set points.

7. The apparatus of claim 6, wherein the operator control history comprises one or more actuator histories.

8. The apparatus of claim 6, wherein the processing device is further configured to:

store an operational state history for the autonomous vehicle; and wherein the one or more control operations are generated further based on the operational state history.

9. The apparatus of claim 6, wherein the processing device is further configured to store the one or more control operations in an autonomous control history.

10. The apparatus of claim 9, wherein the processing device is further configured to generate, based on the operator control history and the autonomous control history, another one or more control operations for the autonomous vehicle.

11. An autonomous vehicle comprising:

a memory; and a processing device, operatively coupled to the memory, the processing device configured to:

store, during an operator control of an autonomous vehicle in a non-autonomous driving mode, an operator control history as a sliding window time series of a plurality of most recent instances of operator control history; and reduce a delay for generating one or more actuator control signals, using a proportional-integral-derivative controller and an integral based on the sliding window time series, in response to transitioning to an autonomous driving mode by:

generate, in response to entering the autonomous driving mode and based on the operator control history, one or more control operations for the autonomous vehicle by generating the one or more actuator control signals, wherein the one or more actuator control signals are configured to drive one or more process values including a current velocity to desired set points.

12. The autonomous vehicle of claim 11, wherein the operator control history comprises one or more actuator histories.

13. The autonomous vehicle of claim 11, wherein the processing device is further configured to:

store an operational state history for the autonomous vehicle; and wherein the one or more control operations are generated further based on the operational state history.

14. The autonomous vehicle of claim 11, wherein the processing device is further configured to store the one or more control operations in an autonomous control history.

15. The autonomous vehicle of claim 14, wherein the processing device is further configured to generate, based on the operator control history and the autonomous control history, another one or more control operations for the autonomous vehicle.

16. A non-transitory computer readable storage medium storing instructions which, when executed, cause a processing device to:

store, during an operator control of an autonomous vehicle in a non-autonomous driving mode, an operator control history as a sliding window time series of a plurality of most recent instances of operator control history; and reduce a delay for generating one or more actuator control signals, using a proportional-integral-derivative controller and an integral based on the sliding window time series, in response to transitioning to an autonomous driving mode by:

generate, in response to entering the autonomous driving mode and based on the operator control history, one or more control operations for the autonomous vehicle by generating the one or more actuator control signals, wherein the one or more actuator control signals are configured to drive one or more process values including a current velocity to desired set points.

17. The non-transitory computer readable storage medium of claim 16, wherein the operator control history comprises one or more actuator histories.

18. The non-transitory computer readable storage medium of claim 16, wherein the instructions, when executed, further cause the processing device to:

store an operational state history for the autonomous vehicle; and wherein the one or more control operations are generated further based on the operational state history.

19. The non-transitory computer readable storage medium of claim 16, wherein the instructions, when executed, further cause the processing device to store the one or more control operations in an autonomous control history.

20. The non-transitory computer readable storage medium of claim 16, wherein the instructions, when executed, further cause the processing device to generate, based on the operator control history and the autonomous control history, another one or more control operations for the autonomous vehicle.

* * * * *